United States Patent
Fröhlich et al.

(10) Patent No.: US 10,926,802 B2
(45) Date of Patent: Feb. 23, 2021

(54) SHARED SAFETY CELL FOR PASSENGER CARS

(71) Applicant: Outokumpu Oyj, Helsinki (FI)

(72) Inventors: Thomas Fröhlich, Ratingen (DE); Stefan Lindner, Willich (DE)

(73) Assignee: OUTOKUMPU OYJ, Helsinki (FI)

(*) Notice: Subject to any disclaimer, the term of this patent is extended or adjusted under 35 U.S.C. 154(b) by 0 days.

(21) Appl. No.: 16/755,325

(22) PCT Filed: Oct. 10, 2018

(86) PCT No.: PCT/EP2018/077650
§ 371 (c)(1),
(2) Date: Apr. 10, 2020

(87) PCT Pub. No.: WO2019/072939
PCT Pub. Date: Apr. 18, 2019

(65) Prior Publication Data
US 2020/0385057 A1 Dec. 10, 2020

(30) Foreign Application Priority Data

Oct. 10, 2017 (EP) .................................. 17195802

(51) Int. Cl.
| B60J 7/00 | (2006.01) |
| B62D 21/15 | (2006.01) |
| B62D 29/00 | (2006.01) |
| B62D 31/02 | (2006.01) |
| B62D 31/00 | (2006.01) |

(52) U.S. Cl.
CPC ........... B62D 21/15 (2013.01); B62D 29/007 (2013.01); B62D 31/02 (2013.01); B62D 31/003 (2013.01)

(58) Field of Classification Search
CPC ............. B66B 1/2458; B66B 2201/211; B66B 2201/222; B66B 1/20; B66B 1/468; E05B 77/06; B60R 2021/01325; B60R 2021/01327; B60R 21/0132; B60R 22/1952
See application file for complete search history.

(56) References Cited

U.S. PATENT DOCUMENTS

2006/0290124 A1* 12/2006 Kasubke ................. B60R 21/13
280/756
2008/0223637 A1 9/2008 Bartilson
(Continued)

FOREIGN PATENT DOCUMENTS

| DE | 14 05 866 A1 | 1/1969 |
| DE | 44 33 550 A1 | 3/1995 |
| DE | 10 2008 057884 A1 | 5/2010 |

OTHER PUBLICATIONS

International Search Report of the International Searching Authority for PCT/EP2018/077650 dated Jan. 18, 2019.
(Continued)

*Primary Examiner* — Kiran B Patel
(74) *Attorney, Agent, or Firm* — Robert P. Michal, Esq.; Carter, DeLuca & Farrell LLP

(57) ABSTRACT

The present invention relates to a passive safety cell (2) for passenger cars with alternative powertrains which is shared for the passengers (3) as well as for the energy source (4) with its main components, to protect both units in one cell.

12 Claims, 4 Drawing Sheets

(56) References Cited

U.S. PATENT DOCUMENTS

Figure 1:
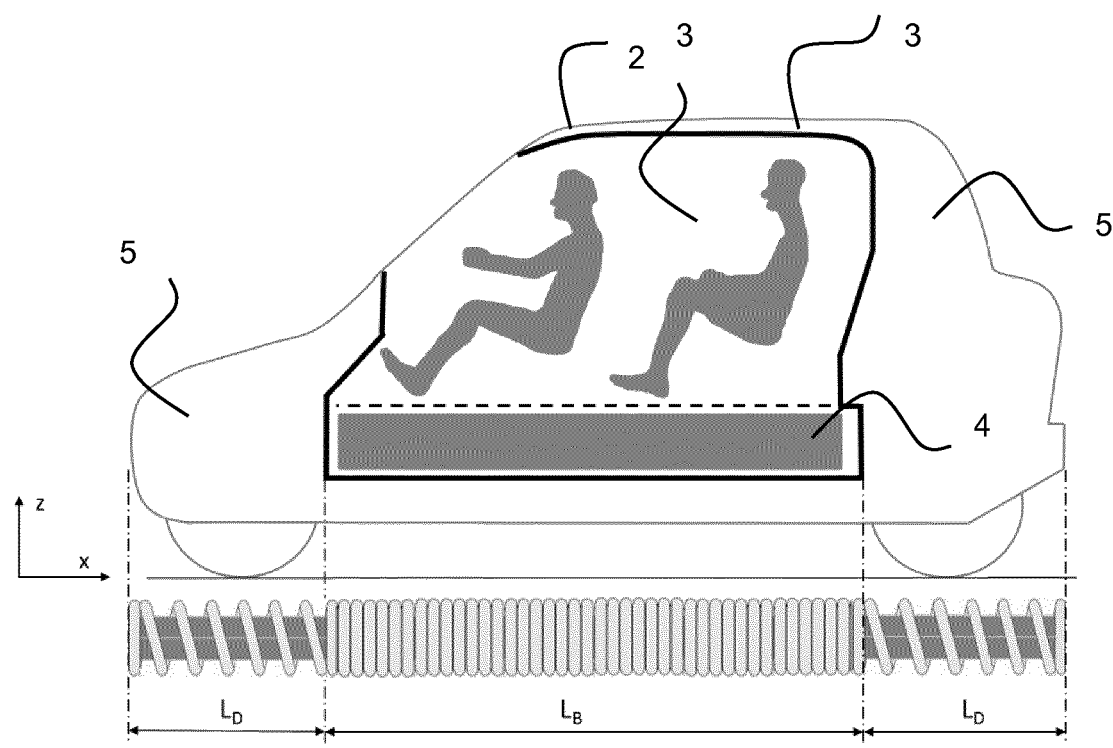

| | | | | |
|---|---|---|---|---|
| 2013/0180788 | A1* | 7/2013 | Jin | B60L 53/14 |
| | | | | 180/65.1 |
| 2014/0312580 | A1* | 10/2014 | Gale | B62D 9/02 |
| | | | | 280/5.509 |
| 2016/0347160 | A1 | 12/2016 | Landgraf | |
| 2017/0253271 | A1* | 9/2017 | Bertezzolo | B62D 63/025 |
| 2018/0237086 | A1* | 8/2018 | Evans | B60L 50/40 |
| 2018/0251090 | A1* | 9/2018 | Gao | B60R 19/20 |
| 2018/0320402 | A1* | 11/2018 | Evans | B60L 53/14 |

OTHER PUBLICATIONS

International Preliminary Report on Patentability issued by the International Bureau of WIPO in relation to International Application No. PCT/EP2018/077650 dated Apr. 14, 2020 accompanied with the Written Opinion of the International Searching Authority issued by the European Patent Office acting as the International Searching Authority dated Apr. 18, 2019 (7 pages).

\* cited by examiner

SHARED SAFETY CELL FOR PASSENGER CARS

The present invention relates to a passive safety cell for passenger cars with alternative powertrains which is shared for the passengers as well as for the energy source with its main components to protect as one cell booth units.

In 1886 Gottlieb Daimler with his invention of a motorised carriage and Karl Benz with his invention of a motor vehicle established the automobile as one new individual private transport technology for passengers. In the first decades of their onset motor vehicles were obviously derived by horse carriages and coaches. Therefore, the safety of such automotive constructions were also adopted from the slower horse carriages with their totally other movement behavior. One new phenomenon was for example the occurrence of front crashes and the direct and fatal impact on the driver and co-driver because of the missing horse in the front. That is why still in the 1920ies fatal accidents results because of the way the steering was constructed: One long steering column which behaves like a lance during a front crash. Also, side impacts where a new experience. As a result, new construction methods need to be invented, approved and inserted to guarantee the passenger safety for motor vehicles.

Two examples of new passive safety concepts in the 1930ies and 1940ies were the X-tubular frame described in the DE patent application 767715C or the platform frame from the DE patent application 742977C. Bela Barenyi developed with his split car body (DE704477C, DE834048C) and the cell structure design (DE810924C, DE826699C, DE835843C, DE820380C) the forerunner of modern safety car concept and therefore those concepts can be rated as the bridge between old and new safety car concepts. As an intermediate stage to today's safety car concept the patent applications DE828485C and DE933372C with their transverse bulkhead (b-pillar) and the invention of a centre longitudinal beam (DE755321C, DE683885C, DE741448C) can be mentioned. Also the integration of transverse walls (DE841852C, DE823698C, DE973838C) in front and behind the passengers are well known from today's passenger cars and represent one step to the later developed passenger cell. Further steps into this direction are the patent applications DE885204C, DE947856C or DE843503C.

One big disadvantage from passenger cars till the 1950ies was the circumstance that from a material point of view the strength in longitudinal centre line was nearly the same over the whole length of the vehicle. Bela Barenyi defines in his DE patent application 854157C a passenger compartment with the highest strength level of the car. The strength decreases constant or in gradual phases in direction of the front and back end of the vehicle. Thereby the safety cell for passenger cars was invented to protect passengers during an accident or crash situation. Since then the front compartment and rear end of the car are known as deformable zones. Bela Barenyi used again the cell structure design and speaks of center cell for the higher strength passenger cell and outer cells for the softer front compartment and rear end. Moreover, he defined predetermined breaking points to create a further protection of the safety cell and the inside passengers. With the addition of distortion members (today known as crash boxes), pointed out in the DE patent application DE1157935B, the passive safety concept still applies in principle today.

The design of state of the art passenger safety cells is since then more or less orientated into the longitudinal direction of the vehicle. In fact 46% of accidents happen as a front crash plus additional 27% as rear impact so as a result, 73% of all accidents are longitudinal orientated impacts [2]. However, 53% of the analyzed 159,994 accidents of this study occur with a speed v<20 km/h, additionally 38% in a speed range between 21≤v≤46 km/h. But for the 2% of accidents with a speed v≥64 km/h, the number of side-impacts increases excessive whereby 26% of those side-impacts shows a fatally effect plus 57% with a severally consequence. Sideways collisions present the special challenge that supporting active safety systems like restraint systems are not able to be implemented because of the local closeness to the side-impact area (e.g. door or b-pillar). The common way of construction is to increase the car stiffness in this area and to use the before mentioned safety passenger cell with higher strength materials. For car customers, the passenger safety has the highest importance of purchase criteria with 95% proportion in the category "extremely important" [1].

But the safety cell for passengers was developed for passenger cars with combustion engines and its components around. Alternative powertrain concepts, independent if they are build up as a conversion or a purpose design, uses the same passenger safety cell but their components are integrated as mounting parts into the established construction way. As a conclusion, the passenger is still directly protected by the passenger compartment but indirect risks because of crash consequences are not considered at all. Such consequences could be the damage of the vehicle battery for Battery Electric Vehicles (BEV) or Hybrid Electric Vehicles (HEV) with the following spontaneous combustion, short-circuit hazard, leakage of battery fluid and the loss of functionality (costs, effort for repair or changer). The same facts could be pointed out for Fuel Cell Vehicles (FCV) or Fuel Cell Hybrid Vehicles (FCHV). State of the art, the energy sources of alternative powertrains are not part of the passive safety because these systems are not integrated into the passenger compartment to protect them together with the passengers. By protecting also the energy sources of alternative powertrains, passengers as well as other persons like rescue teams are indirectly protected because accident related failures of the energy sources like fire cases, battery fluid contact or electric shocks can be avoided. The "behavior after accident" is one important subsystem of the safety management but with further development potential for passenger cars with alternative powertrains.

One forthcoming challenge will be the topic of autonomous driving, where the occupants have an increased degree of freedom within the passenger car. Therefore, the requirement to protect the passengers under every direction of possible impact increases significantly, too. Existing load paths get lost or fail their effect and must be enhanced by a multi-directional system for every weak point of the car. Especially for the topic of autonomous driving it is not enough in point of safety to design a high strength safety cell. Accelerations forces ("g-forces") must be reduced to create bearable consequences of the impact for the passenger but also for the alternative powertrain system.

All here mentioned points are part of the passive safety or also called accident mitigation. The occupant protection is classified into the different impact directions.

The object of the present invention is to eliminate some drawbacks of the prior art and to achieve a passenger car for alternative powertrains with an integrated safety cell which is shared for the passengers as well as for the energy sources to protect as one cell booth units. The passenger car is designed in a way that in cross direction as well as in height direction of the car the safety system works like a combined spring system whereas the safety cell area works like a spring on the block ("safety area") and the areas surrounding the safety cell to the outer-sides work like a compression spring ("energy absorbing areas"). The effect can be optionally transmitted to the longitudinal side, too, what is more or less known from the mentioned patent applications. The safety cell is arranged between the front and rear axis of the car and included the previous passenger compartment but also the energy sources with the drive technology and its energy storage systems. Single, individual components of the drive technology can be optionally arranged outside the safety cell if they are uncritical for crash and easier handle in point of package, design, assembling or repairing.

The safety cell can be designed optionally into several inner rooms to separate the passengers from the engine. In this case bulkheads known from ships but here in a horizontal orientation can separate the different spaces from each other. With this way of construction, the safety cell ensures the physical protection according the UN R94 and R95 standards to protect against persons touching of the high-voltage components (IPXXB protection) which are completely covered. Further no high-voltage components are able to detach from an electric vehicle. Moreover, no high-voltage components intrude into the actual passenger compartment according to FMVSS 305.

So that the construction of the passenger car is able to work as a combined spring system in the before pointed out way, it is preferably to use metallic materials for the safety cell, more preferably to use steels or stainless steels with high-strength and ultra-high strength properties, whereby the yield strength ratio between the materials used for the safety cell and materials used for the surrounding parts is:

$$r_{RP0.2} = R_{P0.2} \text{ safety cell}/_{RP0.2} \text{ surrounding parts} \geq 2.0,$$

more preferably between $2.5 \leq r_{RP0.2} \leq 3.5$.

Because of the fact that no deformation is allowed for the safety cell, it is preferable to design the vehicle and especially the security cell of the present invention by the yield strength. Summarizing the yield strength is significant higher in the safety cell area in relation to the surrounding parts ("energy absorbing areas") which are designed significant lower. Thereby it can be optionally appropriate that the surrounding area is for its part subdivided into different yield strength areas again. Preferably the yield strength decreases towards the ends of the vehicle related to all vehicle directions: x-axis (longitudinal direction of the vehicle), y-axis (cross-direction) and z-axis (height-direction). In doing so, the different strengths can be steadily and continuously decrease, e.g. by a continuous thickness reduction of a constant strength level material or various heat-treated material, or discontinuously and intermittently decrease, e.g. by combining different strength materials, flexible rolled materials or a tailored product like Tailored welded blanks, Tailored bonded blanks or Tailored tempered materials.

Preferably in point of crash behavior, repair costs and access during it but also with respect of a simple and cost-efficient construction design, the construction of the present invention is arranged in gradually stages for the surrounding areas. The mentioned way of construction for the surrounding areas can be described by the physical effect of a compression spring with its adjustable spring characteristic or spring rate. The spring rate, also called spring stiffness or spring hardness, defines the ratio of a force which affects on the spring and the therefore induced displacement of the spring. The spring rate D as an SI-unit can be calculated by using the formula (1):

$$D = F/\Delta L = (E^*A)/L_0 \text{ with the physical unit N·m-1=kg·s-2} \quad (1)$$

Thereby F [kN] is the compressive force or here more detailed the impact force into the vehicle, ΔL [mm] is in general the spring deflection and in this case the contraction of the surrounding parts before reaching the block length, E is the material-depending Young's modulus [N/m$^2$], A is the cross-sectional area of the spring (system) and $L_0$ is the initial length of the spring (system) and in more detail for the case of the present invention the dimensions of the surrounding parts before crash in initial state. In the following $L_0$ is called "Length deformation areas" ($L_D$)

The intruding object can be absorbed depending on the specific vehicle construction in a linear, progressive or degressive spring rate. A linear spring rate corresponds to a constant strength level of the surrounding parts. A non-linear progressive spring characteristic corresponds to a decrease of strength towards the ends of the vehicle, steadily or discontinuously depending on the vehicle construction. In this case the energy is absorbed firstly and at the end a high resistance against the impact is created. Conversely a degressive spring characteristic can be used if initially a high resistance is desired and then the energy will be absorbed within the surrounding parts. The described spring effect for the surrounding parts can be set-up in different arrangements to reach the best combination of stiffness and energy absorption:

parallel arrangement
serial arrangement
combined arrangement

One other parameter to describe the surrounding parts behavior during crash is the spring deflection which is described for a compressive (spiral) spring as the way the spring can cover from the initial unloaded state up to the state where winding upon winding is located. The end state is called block length. The spring deflection can be interpreted as the maximum intrusion level of the surrounding parts and depends on the usable package for side areas (y-axis) or for underbody and roof structures (z-axis) or also for front or rear structures (x-axis). The higher the spring deflection, the higher is the energy absorption and the lower the forces and accelerations on the safety cell and thereby on the occupant and energy storage inside. As a particularly favorable spring characteristic design for the present invention, a conical helical compression spring or a system with the same operating principle can be mentioned with the advantage of a defined block length in combination with a low package need and a high energy absorption potential (low spring rate).

As a preferably used material of the present invention high strength stainless steels, more preferably higher strength austenitic stainless steels with significant strain hardening effects, are used for the safety cell. As an ideal embodiment for the present invention steels are used which have a yield strength $R_{P0.2} \geq 500$ MPa, more preferably $R_{P0.2} \geq 800$ MPa, and a tensile strength $R_m \geq 1,000$ MPa, with a ratio between yield strength and tensile strength ≥65%, more preferably ≥75%. Another preferably material is represented by the group of press-hardenable, or also called hot-formable, boron-manganese alloyed steels like 22MnB5 which can be hardened during hot-forming to tensile strength levels between 1250-2200 MPa. On the same way of heat-treatment the martensitic stainless steels like 1.4034 are suitable to create mechanical properties with $R_{p0.2} \geq 1200$ MPa as well as $R_m \geq 1800$ MPa and therefore to reach the target of a high stiffness, non-deformable safety cell. Especially the group of stainless steels demonstrates increasing possibilities in comparison with the present invention: Their heat-, acid and corrosion resistance expanded the safety cell with additionally benefits and protect with these properties the occupants as well as the energy sources further.

The method of the present invention can be adapted for all classes of vehicles starting from "minicars" over "compact class" and "mid-range-segment" trough to "luxury class", vans" or "SUVs". The different dimensions according to ECIE (European Car Manufacturer Information Exchange Group—Issue 17) like length of the car (L103), the wheelbase (L101) or the ground clearance (H157) variated in relation to the vehicle class but without a consequence to the system of the present invention. Also, passenger-related dimensions like the chair height H30 as the vertical distance from the hip point to the heel contact level are not influenced by the invention what enables further degrees of freedom in point of vehicle design and interior space arrangement for the car body engineers.

With the method of the present invention, the passengers occupy a higher seat height, having a direct input to the indirect safety because of the increased overview. Regarding to the trend of SUVs in European countries over the last years, this feature gives passengers a feeling of convenience. Furthermore, the higher position of the passengers in relation to the lower arranged load paths (represent by components like front and rear crash boxes, cross and longitudinal beams) constitute an increased safety level, too. During a crash, the impact forces can be derived under the passenger and the security cell. The mechanism can be illustrated with the example of bumper cars. On the contrary to the DE patent application 885818C the method of the present invention shows no overhanging elements, in fact it is from the outer side a closed unit wherein the security cell is completely embedded into energy-absorbing surrounding areas. An additionally example can be given by trucks where during a crash the combustion engine is derived under the cabinet whereby the occupant is safe by its higher seating position. Additionally, the arrangement of the present invention offer also during side-impact situations a higher safety level because the intrusion works not directly into the occupants body level (door side-impact beam or middle part of b-pillar), in fact the higher seating position related to potential intruding elements like barriers, poles or other vehicles with their lower arranged crash boxes enables to derive the impact forces away from the passengers without an impact on the same level with the passengers. Moreover, the alternative powertrain allowed the vehicle designer to construct optionally a shorter vehicle length in longitudinal direction (x-axis) because of the reduced number of components in relation to combustion engines. This fact can create a benefit to urban areas in point of the parking space situation. In times of alternative power-trains with e.g. their heavy batteries within the battery compartment, the roof structure becomes an increased safety-requirement. During a rollover situation, the complete weight of the battery components works on the roof structure which must be stable without buckling to safe the passengers. This fact is also considered in the method of the present invention: Also for the roof structure, the security cell is defined as non-deformable surrounded by an energy-absorbing area. One preferably way of construction could be the integration of rollover bars known from cabriolets whereby the rollover bar could be connected between the roof and the floor structure of the safety cell to further support a non-deformable safety area. In point of the other impact direction of the z-axis (height direction), the underbody impact, the energy absorbing area under the security cell allows to absorb intruding elements like poles, barriers or sharp and slitting elements without a damaging of the security cell and therefore without damaging the energy source components inside. In general with the safety concept of the present invention, new design opportunities are given to the design engineers.

With adjustment and scaling the present invention also works for other types of electric passenger or goods transport vehicles like busses, people mover, commercial vehicles or parcel delivery. Further the present invention is adaptable to other kinds of transport system where passengers and the energy sources must be protected together like an autonomous driven car, a taxi, small busses or vans. Furthermore, the method of the present invention can be adapted partially for vehicles with combustion engines or hybrid cars with a combustion engine in a way that single, special parts of it are integrated into the security cell like the fuel tank.

Figure 2:
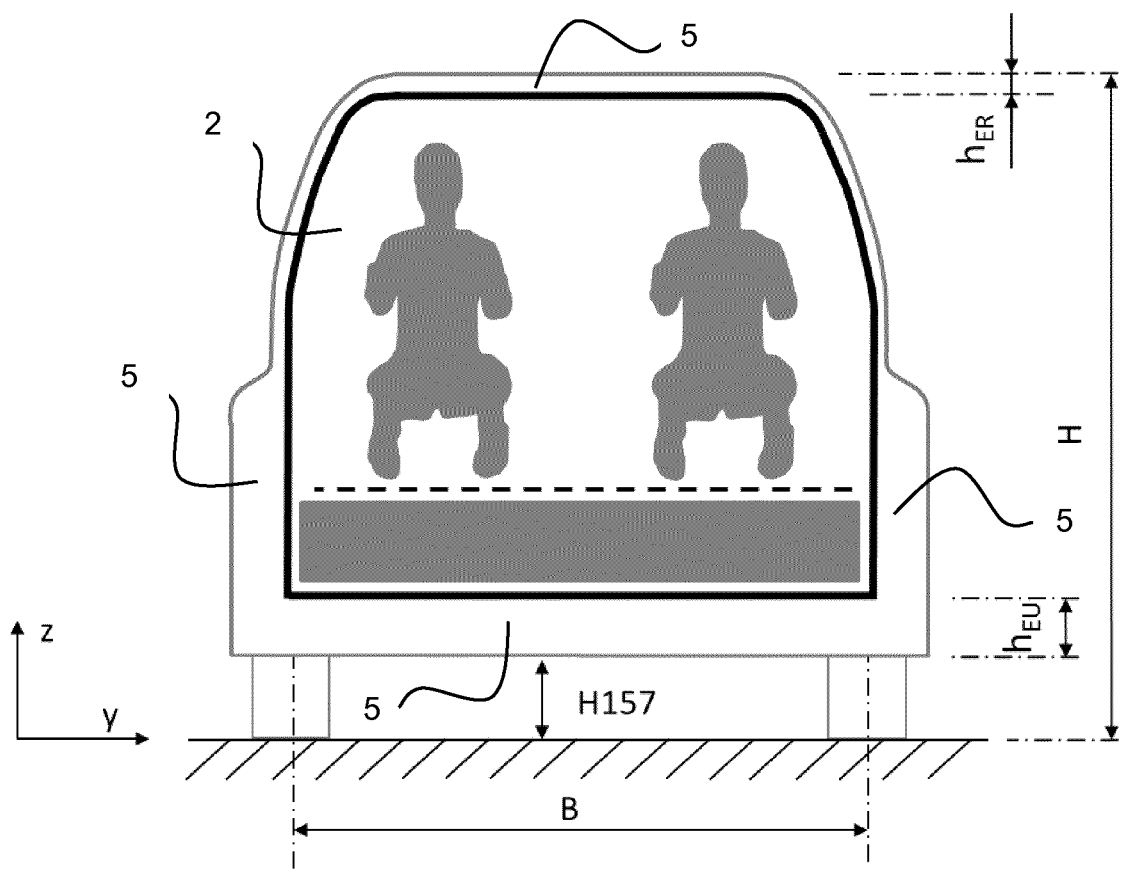
Figure 3:
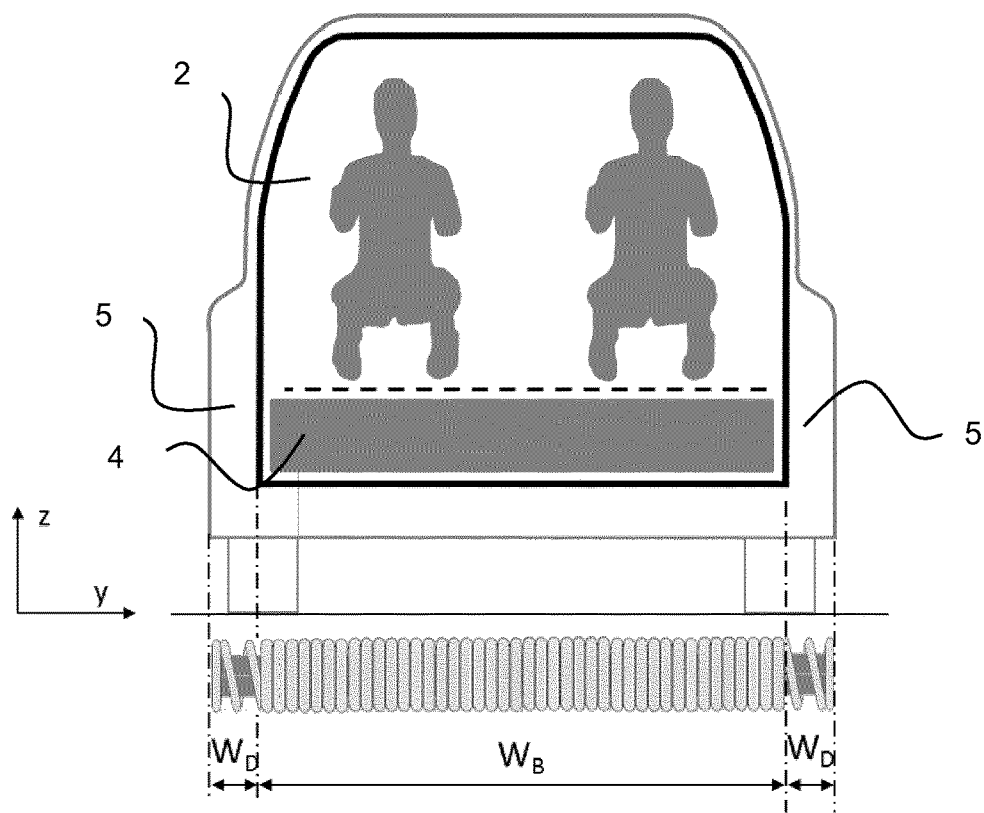
Figure 4:
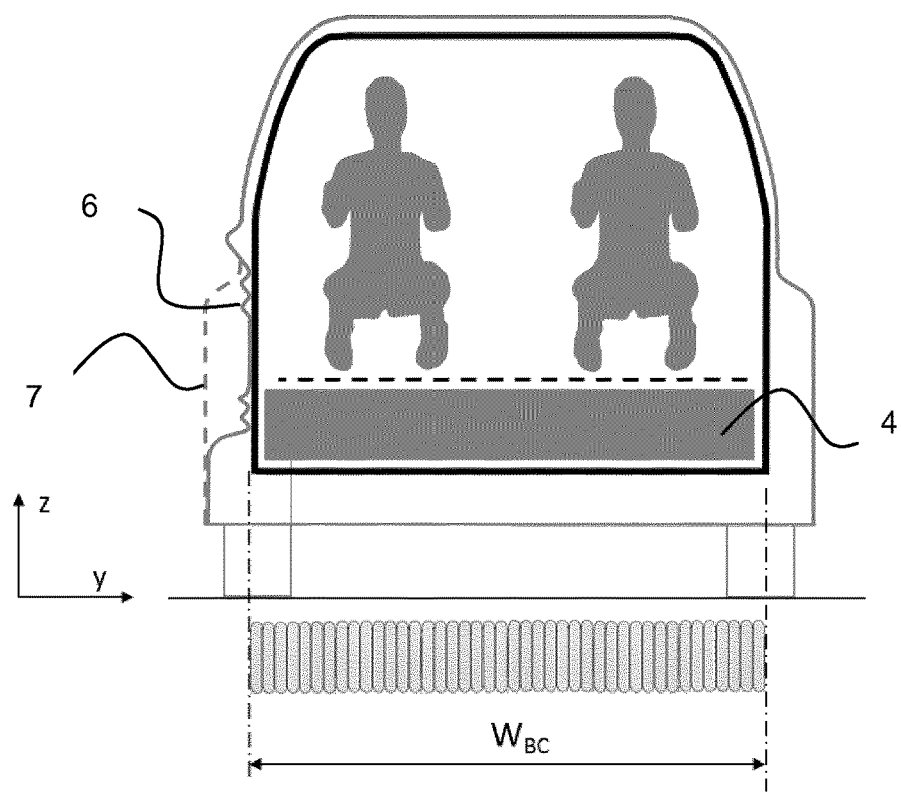
Figure 5:
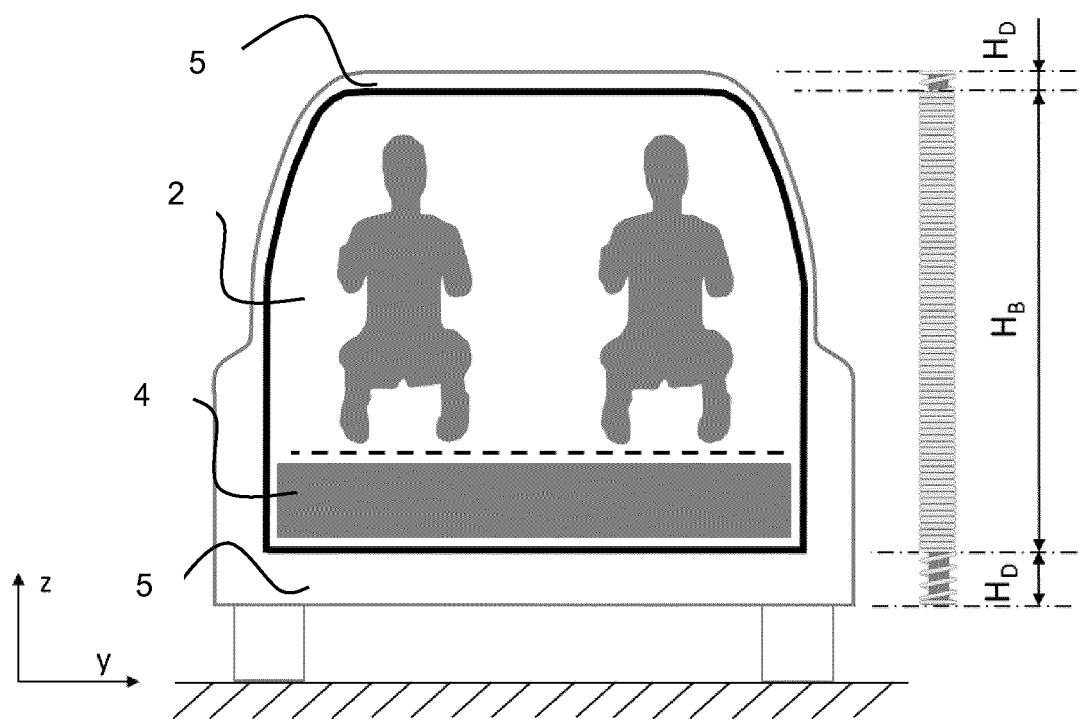
Figure 6:
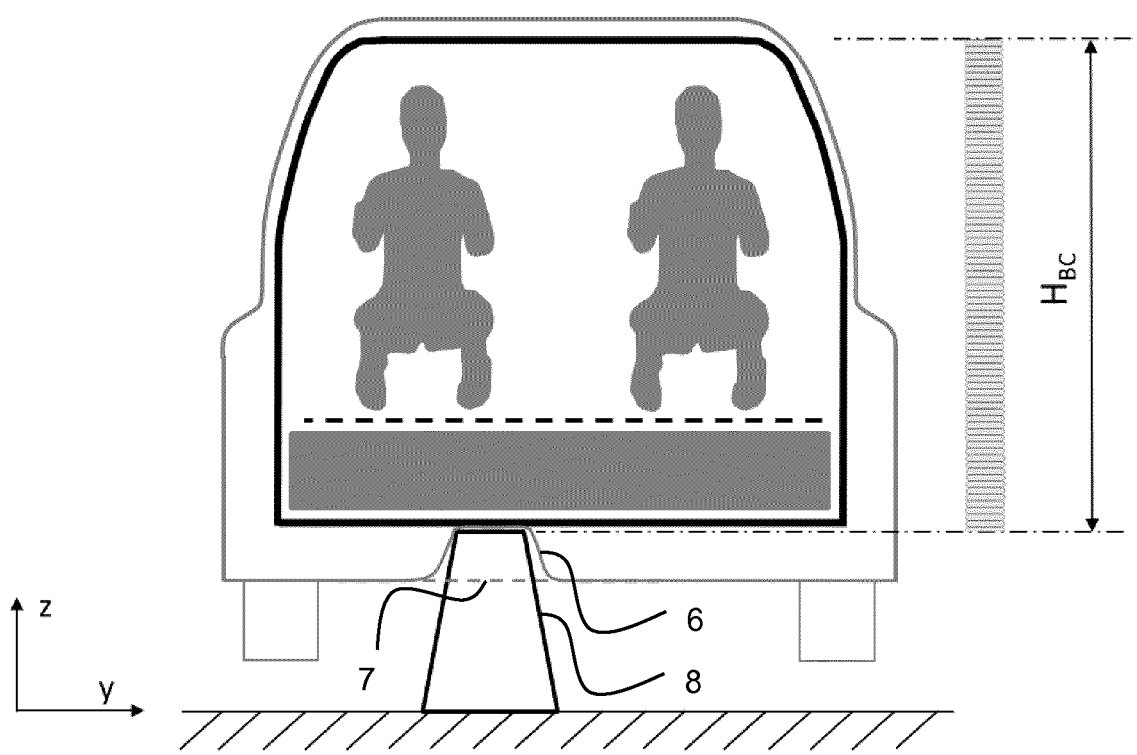
Figure 7:
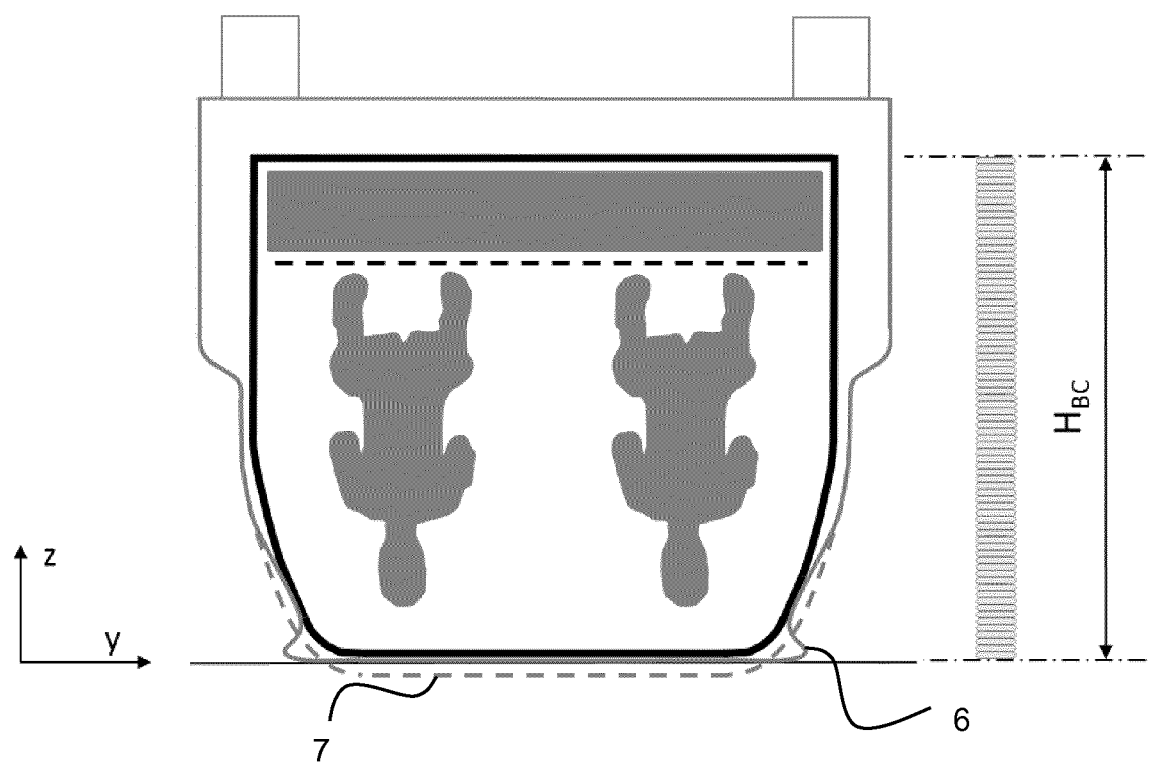

The present invention is illustrated in more details referring to the following drawings where FIG. 1 shows one preferred embodiment of the invention schematically seen from the side view, FIG. 2 shows one preferred embodiment of the invention schematically seen from the front view, FIG. 3 shows one preferred embodiment of the invention schematically seen from the front view, FIG. 4 shows one preferred embodiment of the invention schematically seen from the front view, FIG. 5 shows one preferred embodiment of the invention schematically seen from the front view, FIG. 6 shows one preferred embodiment of the invention schematically seen from the front view, FIG. 7 shows one preferred embodiment of the invention schematically seen from the front view.

FIG. 1 illustrates the way of construction in longitudinal direction (x-axis) of the car as a combined spring system where (as known from state of the art) the softer areas 5 work like a compression spring as energy absorbing areas and therefore called "Length deformation areas" ($L_D$) surrounding the security cell 2 to the outer-sides. The security cell area 2 works like a spring on the block $L_B$ to protect the passengers 3 as well as the energy source 4 and is therefore called "safety area".

FIG. 2 illustrates the preferred design embodiment of a passenger car for alternative powertrains where a non-deformable safety cell 2 is surrounded into cross direction (y-axis) and height direction (z-axis) from softer areas 5 which works like a compression spring to absorb crash energy.

FIG. 3 illustrates the way of construction in cross direction (y-axis) of the car as a combined spring system where the softer areas 5 work like a compression spring as energy absorbing areas and therefore called "Width deformation areas" (WD) surrounding the security cell 2 to the outer-sides. The security cell area 2 works like a spring on the block $W_B$ to protect the passengers 3 as well as the energy source 4 and is therefore called "safety area".

FIG. 4 illustrates the behavior during a crash from the cross direction (y-axis, side impact) where the vehicle dimensions after crash 6 are related to the vehicle dimensions before crash 7. The dimension $W_{BC}$ defines the block length after crash of the whole (combined) spring system.

FIG. 5 illustrates the way of construction in height direction (z-axis) of the car as a combined spring system where the softer areas 5 work like a compression spring as energy absorbing areas and therefore called "Width deformation areas" ($H_D$) surrounding the security cell 2 to the outer-sides. The security cell area 2 works like a spring on the block $H_B$ to protect the passengers 3 as well as the energy source 4 and is therefore called "safety area".

FIG. 6 illustrates the behavior during a crash from height direction (z-axis) initiated by an underbody impact where the vehicle dimensions after crash 6 are related to the vehicle dimensions before crash 7. The dimension $H_{BC}$ defines the block length after crash of the spring system because of an underbody impact like a pole, barrier or other slitting objects 8.

FIG. 7 illustrates the behavior during a crash from height direction (z-axis) initiated by an impact into the roof structure (rollover) where the vehicle dimensions after crash 6 are related to the vehicle dimensions before crash 7. The dimension $H_{BC}$ defines the block length after crash of the spring system.

SOURCES

[1] H.-H. Braess, U. Seiffert: Vieweg Handbuch Kraftfahrzeugtechnik, 6.Auflage, ATZ Vieweg Teubner, 2011
[2] M. Büchsner: Integration of occupant safety systems into seating environment in the light of autonomous driving, presentation at 2nd Annual Seating Innovation Summit Berlin (6 Apr. 2017)

The invention claimed is:

1. A passenger car for alternative powertrains, the passenger car including an integrated security cell that is shared by passengers and energy sources to protect both as a unit, the security cell surrounded by a lower strength energy absorbing area, wherein the security cell, in cross direction as well as in height direction of the passenger car, is configured as a combined spring system in which an area of the security cell works like a spring on a block and areas surrounding the security cell to outer-sides thereof work like a compression spring.

2. The passenger car for alternative powertrains according to claim 1, wherein in addition to the cross direction and the height direction, a longitudinal side of the passenger car is configured as the combined spring system in which the security cell area works like the spring on the block and the areas surrounding the security cell to the outer-sides work like a compression spring.

3. The passenger car for alternative powertrains according to claim 1, wherein the security cell is arranged between a front axis and a rear axis of the passenger car.

4. The passenger car for alternative powertrains according to claim 1, wherein the security cell is separated into at least two inner rooms by bulkheads that separate the passengers from an engine of the car.

5. The passenger car for alternative powertrains according to claim 1, wherein a yield strength ratio between materials of the security cell (2) and materials of the surrounding parts is >2.0.

6. The passenger car for alternative powertrains according to claim 1, wherein the security cell includes strain hardening austenitic stainless steels with a yield strength >520 MPa.

7. The passenger car for alternative powertrains according to claim 1, wherein the security cell includes press-hardenable steels with a tensile strength >1,200 MPa.

8. The passenger car for alternative powertrains according to claim 1, wherein the areas surrounding the security cell as crash absorption elements working like a compression spring.

9. The passenger car for alternative powertrains according to claim 1, wherein the areas surrounding the security cell includes spring steels.

10. The passenger car for alternative powertrains according to claim 1, wherein an underbody and powertrain-components surrounding elements are made with stainless steels.

11. The passenger car for alternative powertrains according to claim 1, wherein the passenger car is an autonomous driven car, a taxi, a bus, or a van in which passengers and energy sources are protected together in one security cell.

12. The passenger car for alternative powertrains according to claim 1, wherein the passenger car is powered by a combustion engine or a hybrid-combustion engine and single parts of such engine are integrated into the security cell.

* * * * *